Patented Jan. 4, 1938

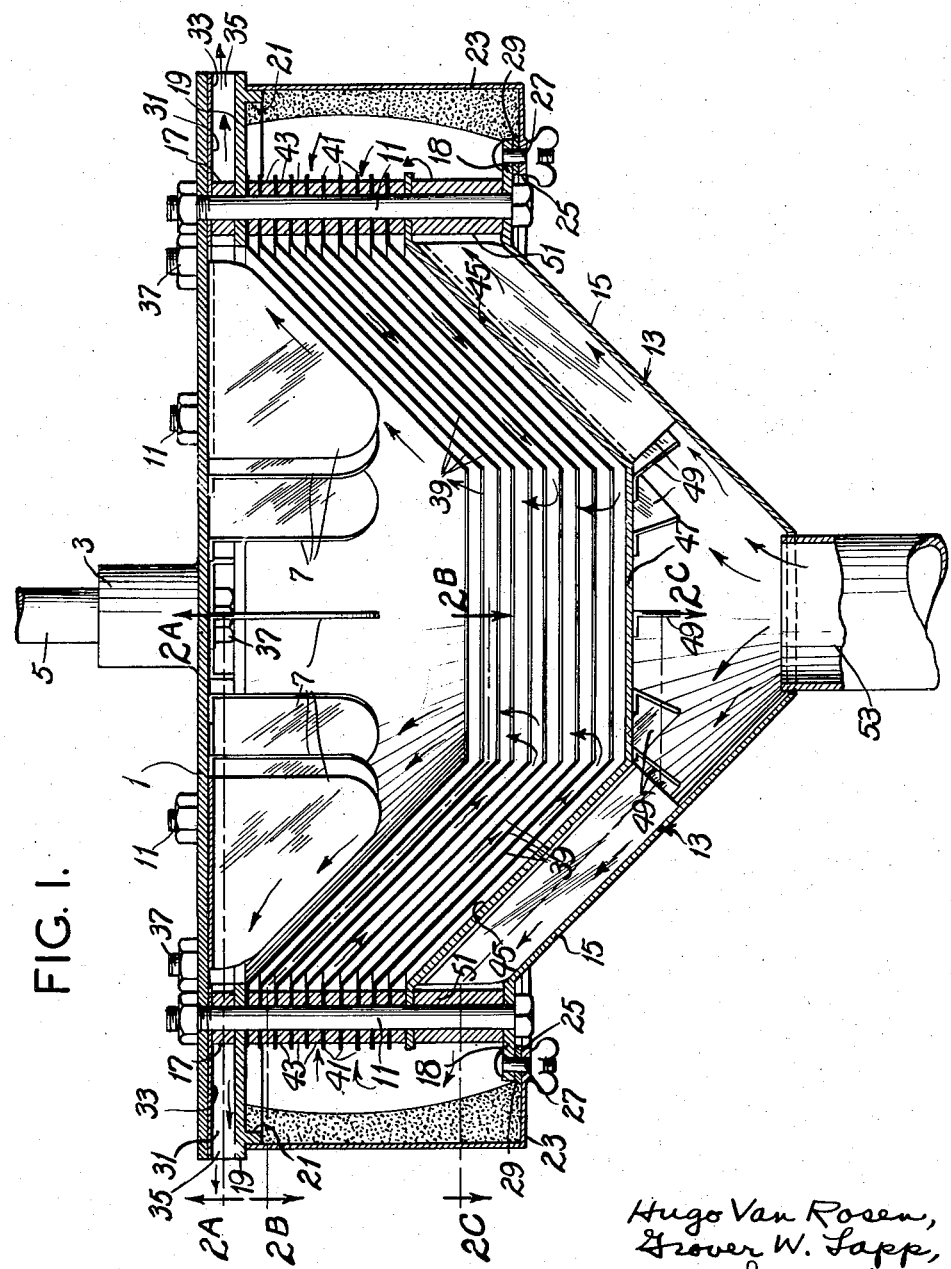
FIG. I.

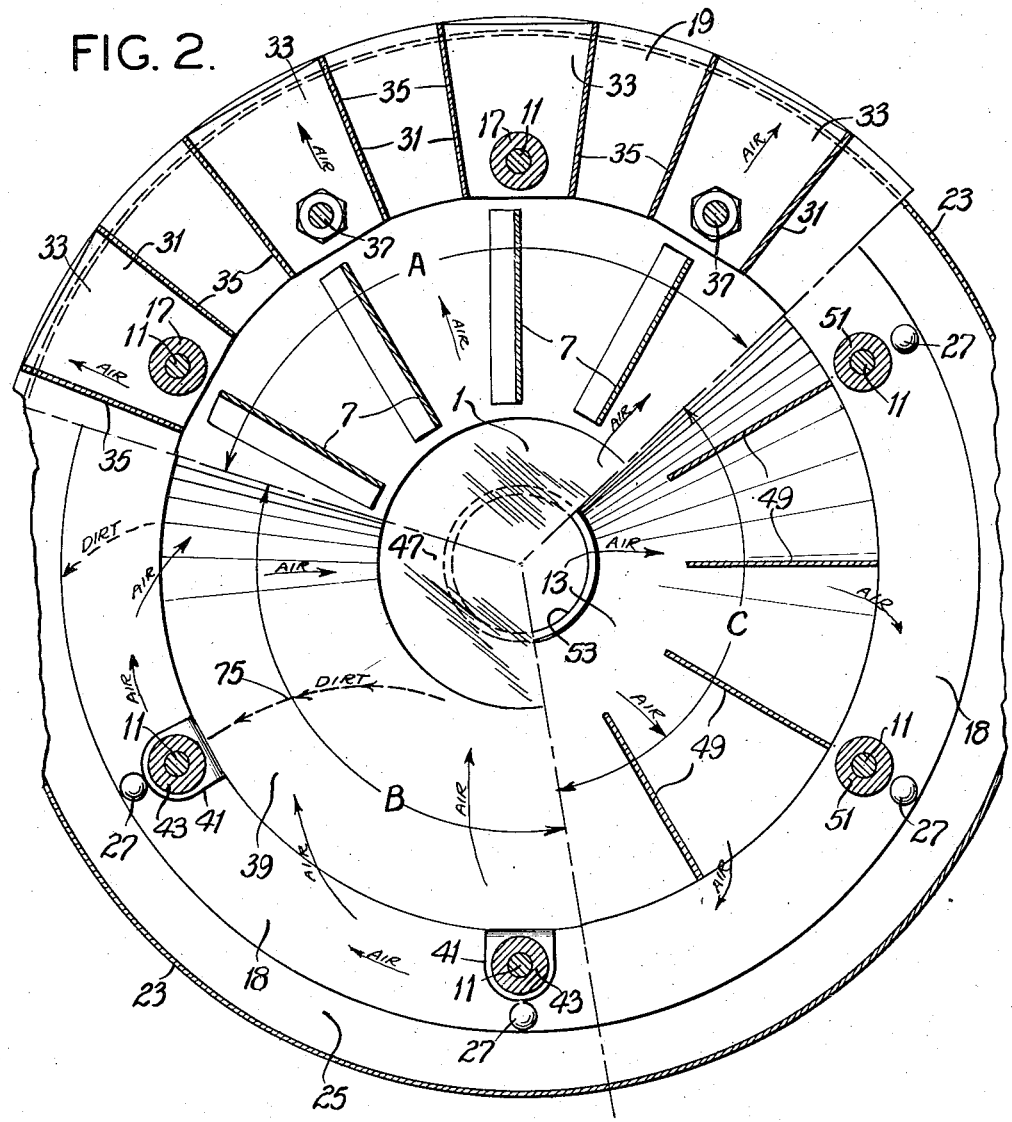

2,104,683

UNITED STATES PATENT OFFICE 2,104,683

DUST SEPARATOR

Hugo Van Rosen, Newton Center, Mass., and Grover W. Lapp, Le Roy, N. Y.; said Lapp assignor to said Van Rosen, now by judicial change of name Hugo Van Roosen Application July 6, 1933, Serial No. 679,222

7 Claims. (Cl. 183—77)

This invention relates to dust separators, and with regard to certain more specific features, to dust separators operating upon the principle of centrifugal dynamic separation.

Among the several objects of the invention may be noted the provision of a dust separator of the class described which operates, with minimum power consumption, to remove dust or solid particles from the gas medium in which they are suspended, the removal being accomplished effectively for all particle sizes that it is desired to remove; a dust separator of the class described which effects complete precipitation from relatively large quantities of dust-laden gas in a minimum of time and space, the entire separator, in ordinary circumstances, occupying only a space of the nature of that required for a centrifugal blower or the like; a separator in which the dust precipitation is efficient and complete and the dust segregation, after precipitation, is equally efficient and complete, so that the discharged gas is in fact dust-free to the required extent; and a separator of the class described which is relatively simple in construction and operation. Other objects will be in part obvious and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which is illustrated one of various possible embodiments of the invention, Fig. 1 is an axial section of a separator embodying the present invention; and, Fig. 2 is a composite view, representing cross-sections taken along lines 2A, 2B, and 2C of Fig. 1.

Similar reference characters indicate corresponding parts throughout the several views of the drawings.

The present invention is concerned particularly with that class of dust precipitation apparatus which operates on inertial principles, that is, upon the basis of the fact that the suspended matter to be precipitated has a density largely in excess of that of the suspending medium. The suspended matter is generally solid, comprising a large number of minute particles, while the suspending medium is usually air. However, the present invention operates also when the suspended matter is liquid, in the form of minute droplets, or when the suspending medium is any other gas.

It has been determined that, in the majority of suspensions of the type herein concerned, the particle size ranges from below one micron in diameter to 100 or more microns in diameter. From the health standpoint, particles larger than 100 microns in diameter are generally considered non-injurious. It so happens that the majority of industrial suspensions which it is desirable or necessary to separate, comprise particles within the range of 0.5 to 100 microns in diameter. For example, reliable determinations have established the following table:

| Kind of suspension | Particle diameter |
|---|---|
| Talc dust | 9 to 10 microns |
| Silica dust | 3 to 5 microns |
| Ammonium chloride fumes | About 1 micron |
| Paint pigment dust | 2 to 5 microns |
| Cement dust | 40 microns and less |
| Alkali fumes | 1 to 5 microns |
| Coal-ash spheres | 5 to 10 microns |

The present invention is designed to precipitate, accordingly, particles varying in diameter from about 0.5 up to 100 microns, although it will be understood that the design factors may be altered to make the device more suitable for finer, or coarser particles.

The basic rules affecting the separation of particles of these sizes from their gas suspending media are, first, Stokes' law, and, second, the laws of centrifugal force. Stokes' law gives the final, stable velocity of fall of a particle in a still gas according to the formula (1) $$V_s = \frac{gd^2p}{km}$$

where $V_s$ is the velocity of the particle with respect to the gas;
    $d$ is the diameter of the particle,
    $p$ is the density of the particle,
    $g$ is the acceleration due to gravity,
    $m$ is the viscosity of the gas, and
    $k$ is a constant.

If the values be calculated for particles of density about 3.0, and in air (viscosity=$1.8 \times 10^{-4}$ c. g. s. units), the following table is secured:

| Diameter of particles, microns | Rate of fall, feet per second |
|---|---|
| 100 | 3 |
| 74 | 1.6 |
| 10 | .03 |
| 1 | .0003 | from which it is evident that in still air no appreciable settling at all would occur within reasonable time with particles of a diameter of 10 microns or less.

With inertial methods of separation, the acceleration of gravity in the above formula is replaced by an acceleration due to centrifugal force. The centrifugal force is achieved, in devices heretofore used, by conducting a stream of the suspension around a circle or fraction of a circle, in a "cyclonic" manner. The basic formula for such inertial or centrifugal separation is as follows:

$$(2) \quad V_s = \frac{d^2 p a w^2}{km}$$

where $a$ is the radius of curvature of the path described by the gas, $w$ is the angular velocity of the gas and suspended matter, $k$ is a constant, and the other symbols indicate the same properties as those set forth in connection with Equation (1) above. This formula is derived by substituting the centrifugal force for the gravitational in the Stokes' law Equation (1) above.

From the practical standpoint, however, it is not the settling velocity of the particle which is important, but rather the radial distance D the particle will move out of the gas stream while in the separator. If it be assumed that the gas moves in a circular path with a uniform velocity V, and that while in the apparatus it will move through the angular distance S, then the following equation will express the relation between V, D, and S:

$$(3) \quad V = \frac{kDm}{Spd^2}$$

Following this equation, if it be assumed that an apparatus similar to a cyclone is used, in which the entire path of the gas is circular and in a horizontal plane, and that the angular distance is about 4 radians, and that the particle must move a distance of 3 feet in order to be precipitated, the following relation between the values for V and $d$ are obtained:

| Diameter of particles, microns | Gas velocity, feet per second |
|---|---|
| 100 | 8 |
| 74 | 15 |
| 10 | 800 |
| 1 | 80,000 |

From these figures it is evident that the ordinary cyclone type precipitator is impractical for particles smaller than, say, 50 microns in diameter, on account of the high gas velocity required.

In the present invention, which operates upon the inertia principles and according to the Equation (3) above, separation and precipitation of particles of small diameter is achieved, first, by increasing the centrifugal force value greatly by increasing the angular velocity of the gas, and, second, by reducing to a relatively small linear distance the path through which the particle must move in order to be precipitated.

While it has not heretofore been mentioned, it will be apparent that capacity is another of the factors affecting the practical utility of separators of the type herein concerned. Broadly, the capacity of the separator is the volume of gas and suspended matter that the separator will operate upon in a unit of time. This involves consideration of the concentration of particles in the suspension, for the separator must be able to take care of all of the particles precipitated in the unit volume; otherwise there will be a flooding and the device will not separate efficiently. The separator of the present invention is designed to have a large capacity in terms of volume throughout, and is further designed to take care of all particles precipitated, as it is continuous in its particle discharge as well as in its cleaned gas discharge.

Basically, the present invention comprises a series of surfaces arranged so as to be at an angle to an axis of rotation, and means for creating a swirl or vortex of the suspension from the outer periphery of the series of surfaces inwardly, precipitation then taking place on the surfaces due to the centrifugal force exerted on the particles by the swirl or vortex action. In the preferred embodiment, the surfaces comprise a series of nested cones which are spaced apart a relatively short distance, such as from one-eighth to one-tenth of an inch more or less. The dust-laden air is admitted to the cones at their outer periphery, preferably at a high tangential speed, and it swirls inwardly through the cones to be discharged at the center of the nest, the swirl providing the centrifugal force to precipitate the dust particles on the cone walls. Then, in order to discharge the dust, the cones are themselves rotated at a high angular speed, whereby the precipitated dust particles are thrown outwardly to the outer periphery of the cones by centrifugal action directly thereon. As the precipitated particles roll or slide outwardly, under the tremendous centrifugal forces, they agglomerate into large aggregates (in the manner that a snow-ball agglomerates in rolling down a hillside) so that when the periphery is reached, the aggregates are of sufficient size that they are literally thrown across the incoming stream of air, possibly without disintegrating, to a suitable dust receptacle. This counterflow of the incoming dirt-laden air and the discharging precipitated dirt is one of the basic features of the present invention.

Proceeding to a more detailed description of the preferred form of the invention, reference is directed to Fig. 1 of the drawings, wherein numeral I indicates a circular face plate to which is affixed a collar 3 which receives the shaft 5 of a suitable motor (not shown). On the under side of the plate I are welded or otherwise affixed a series of radialy disposed fan blades 7 (see also Fig. 2, section A).

Supported on the face plate I by means of bolts II are the elements constituting the precipitator per se. The lowermost of such elements comprises a housing member I3, which has a frusto-conical portion I5 and a horizontal portion I8 (through which the bolts II pass).

Also supported on the bolts II, and spaced from the face plate I by collars I7 on said bolts II, is a flat annular ring or plate I9, which has, near the periphery thereof, a depending flange 2I. Telescoping with the flange 2I is the top edge of a cylindrical dust can or collector 23. The can 23 has a bottom 25 which is open at the center, the inner edge of the bottom being secured to the horizontal portion 18 of the housing 13 by means of bolts and wing nuts 27. A gasket 29 renders this joint air-tight. The telescoping joint between the flange 21 and the can 23 is also desirably air-tight.

Between the plate 19 and the face plate 1 are a number of vane elements 31 (see also Fig. 2, section A), each of which comprises a flat top portion 33 and depending side wings 35, the wings 35 being equal in width to the separation of the plates 1 and 19. In assembly, half of the elements 31 are secured in position (with the wings 35 radial to the face plate 1) by the bolts 11, while the other half, being located intermediate the bolts 11, are attached to the face plate 1 by individual bolts 37. The vane elements 31 serve to aid the primary blades 7 in creating the air draft, as will be described hereinafter. The vane elements 31 and their enclosing plates 1 and 19 constitute a shrouded impeller for air passing through the device.

Between the plate 19 and the housing 13 are mounted, on the bolts 11, the aforementioned cone elements, indicated at numeral 39. Each of the cones 39 is provided with outwardly-extending ears 41 (see also Fig. 2, section B), through which pass the bolts 11. Washers 43 serve to space the adjacent cones apart. The center of each of the cones 39 is open. The number of cones 39 determines the capacity of the separator, and the number shown, ten, is suitable for a relatively large capacity.

Spaced beneath the bottom cone of the group is a cone member 45, which is identical to the cones 39 except that it has a closed center or diaphragm 47, and that it is preferably made of relatively heavier material. To the cone 45 are welded or otherwise affixed a number of radial blades 49 (see also Fig. 2, section C), which extend across to the inner surface of the conical portion 15 of the housing 13. The blades 49 are as long, or longer, than the conical section. In some instances it is desirable to make the blades 49 extend radially beyond the relative location of the outer peripheries of the cones 39. The cone 45 is spaced from the housing 13 by collars 51 on the bolts 11.

The angle of conicity of the cones 39 and 45, and of the housing 13, with respect to the axis of rotation, are all (for reasons to be developed hereinafter) a greater angle than the angle of slip or repose of the particles to be separated. For silica dust separation, for example, the angle of conicity of the cones is desirably made 45°, as shown.

All of the parts thus far described rotate in connection with the fact plate 1. As high rotational speeds are involved, it is advisable that the load be balanced about the periphery; this is done by disposing the bolts 11, etc., in a balanced manner about the apparatus.

Into the center of the housing 13 projects a stationary dust-laden air intake pipe 53. The joint between the pipe 53 and the housing 13 is desirably close enough for just running clearance.

The operation of the separator is as follows:
Assuming the separator to be rotating at a relatively high speed, the blades 7 and vanes 31 create a suction at the pipe 53 which suction is considerably greater than any counter-pumping action of the various cones. This suction draws the dirt-laden air in through the pipe 53 into the housing 13, whence it is carried outwardly through the conical space between the housing 13 and cone 45. The diaphragm 47 of cone 45 prevents the air from passing directly to the center of the cones 39. While in this space, the dirt-laden air is first subjected to centrifugal forces, and the larger particles are precipitated on the inner conical surface of the housing. This precipitation of the larger particles is termed the "scalping" of the dirt-laden air. Furthermore, the dirt-laden air, while being lead radially outwardly, is at the same time positively forced into a swirling action by the vanes or blades 49 so that, by the time the air reaches the outer periphery of the housing 13, it has been accelerated to the same rotational speed as the cones 39 themselves. That is, the tangential velocity of the dirt-laden air as it passes from the outer edges of the cone 45 is equal to the tangential velocity of the edges of the cones 39 themselves. Or, if the blades 49 extend beyond the peripheries of cones 39 as suggested, the tangential speed of the air is higher than that of the cone edges.

The dirt-laden air thus enters the peripheral chamber formed between the casing 13 and the can 23 travelling in a circular path at a high speed. It will be seen that there is but one path for the air to travel, namely, inwardly through the spaces between the cones 39, under the influence of the blades 7. There is thus imparted to the air stream a direction component radially inwardly. Now, the friction between the air stream and the cone surfaces is but slight, so as the air stream travels radially inwardly, it maintains to a substantial extent the tangential velocity that it possessed at the peripheries of the cones 39. Since its radius of curvature is decreasing, therefore, its angular speed increases as it comes closer to the center. This increase of angular speed is a compensating factor for the decrease in radius in the centrifugal force formula, and the centrifugal force tending to precipitate the dust particles thus remains at a high level even up to the center of the cones 39. The tangential speed may actually increase as the air flows radially inwardly, on account of the work done on the air in drawing it inwardly, by the blades 7. Thus, at any rate there is a pronounced forward swirl of the air stream relative to the cones themselves as the air moves inwardly.

The centrifugal force set up upon the dust particles tends to cause them to move radially outwardly until they contact the inner faces of the cones 39, that is, they precipitate. Inasmuch as the radial distance through which the dust particle must travel to precipitate is, ordinarily, relatively slight, not exceeding, for example, one-sixth of an inch, and the velocity (and hence the centrifugal force) are both extremely high, precipitation of even the finer particles readily takes place.

The dust is thus precipitated from the air on the inner surfaces of the cones 39. The air, which is substantially cleaned of all of its dust-content by the time it reaches the inner edge of the cones 39, is drawn through the blades 7 and peripherally distributed through the shrouded impeller comprising the vanes 31 and plates 1 and 19.

The air distributes itself equally in passing through the spaces between the cones 39, so that an equal volume tends to pass through each cone. This is true because, if one cone-space became overcharged with air, such space would immediately exert a greater counter-pumping effect, and thereby immediately equalize itself with the other cones.

The path of the air-stream in the cones 39 will be seen to be substantially that of a vortex, or tornado.

The stream of progressively cleaner gas thus moves counter to the movement of the dust.

The precipitated particles on the surfaces of the cones 39 will now be considered. These particles are no longer suspended, and accordingly, no longer move in accordance with Stokes' law. The forces now acting on the particles comprise, first, a radially-outwardly-directed centrifugal force (set up by the rotation of the cones 39), and, second, a wind friction occasioned by the forward swirl movement of the air in the cone interspaces relative to the movement of the cones themselves. The centrifugal force resolves into two components, one directed out to the periphery of the cones along the surface thereof, and the other directed normally against the cone surface. Thus the particle tends to roll or slide outwardly toward the periphery of the cone on which it lies. But the wind friction does not permit the particle to roll directly radially outwardly, but rather moves it in somewhat of a spiral, as shown by the dotted-line path indicated by numeral 75 on Fig. 2, section B. The movement tends to become more nearly radial as the particle approaches the periphery, as the forward swirl velocity of the air decreases, relative to the cone speed, towards the periphery. The wind-force tends to make the particle roll over and over as it moves, in contrast to a simple sliding. The normally directed component of the centrifugal force now comes into play, and with the other forces acting on the particle, tends to make it agglomerate or coalesce with other particles in its path of movement. This action is similar to that of a snow-ball in rolling down a hillside. A particle that starts near the center of the cones, therefore, reaches the cone periphery as but a part of an immensely larger agglomerate of particles or "snow-ball". It has been observed microscopically that these agglomerates, in the case of colloidal silica dust, for example, are several hundred times the diameter of the individual dust particle.

The agglomerated particles, as they reach the periphery of the cones, are of sufficient size and have sufficient coalescence to be trajected from the edge of the cone across the incoming air stream to the wall of the can 23 without disintegrating. Or, if the particles have not built up into an agglomerate sufficiently large and coherent not to disintegrate, they are picked up by the incoming air stream and carried back into the cone interspaces to be reprecipitated again and again until they do become agglomerates of sufficient size, etc., to hold their shape.

The dust agglomerates collect on the inner side of the can 23 and set up a level therein. As shown, the separator is a "batch" proposition, as it has to be stopped and disassembled (by removing the wing nuts 27) to empty the can 23 whenever it becomes full. The size of the can may of course be increased to accommodate more dust per batch, or a continuous dust take-off may be substituted for the can 23. In any event, the device is adapted to run for quite a while even with the relatively small dust can shown, as the absolute proportion of dust in the incoming air is usually quite small, such as one part in a hundred thousand of air, by volume.

By computation from the Stokes' law formula given in Equation (3) hereinbefore, and the laws of centrifugal force, it may be shown that, in a device constructed as thus described, the quantity of gas passed per minute Q may be expressed by the formula:

$$Q = \frac{Kd^2p}{m} N^2(r_2^2 - r_1^2) n,$$

where $d$ is the diameter of the particle,
$p$ is the density of the particle,
$m$ is the viscosity of the gas,
$N$ is the speed of rotation of the cones in revolutions per minute,
$r_2$ and $r_1$ are, respectively the outer and inner radii of the cones,
$n$ is the number of passages between the cones through which the dirt-laden gas travels, and
$K$ is a constant, approximating the value 0.5.

Trial calculations from the above formula will reveal that all of the factors of construction are well within practical limits. Experimental results check the above equation with reasonable accuracy. Several factors, among which are the fact that Stokes' law does not hold precisely for non-stationary gases, the fact that particles are not all true spheres, and the fact that the tangential speed of the air flow is not at all times determined with exact accuracy by the revolving speed of the separator, contribute to reduce the theoretical quantity values somewhat, or to increase the required revolution speed for the given quantity.

Numerous modifications of the device as shown are possible within the scope of the invention. For example, the separating cones 39 need not be driven directly by the motor, but may be equipped with vanes to derive their motion, in a turbine-like manner, from the tangential motion of the air currents. Variations in the dust collecting system, that is, the means for collecting and removing the dust aggregates after they have been thrown from the revolving cone-edges, are possible within wide ranges.

Water or other suitable liquid may be introduced on the center of the cones and allowed to travel outwardly by centrifugal force, along with the precipitated dust particles.

Another possible variation is one in which the cones 39 are supported on a central spider, and the encasement means, as well as the dust-collecting means, are stationary.

In view of the above, it will be seen that the several objects of the invention are achieved and other advantageous results attained.

As many changes could be made in carrying out the above constructions without departing from the scope of the invention, it is intended that all matter contained in the above description or shown in accompanying drawings shall be interpreted as illustrative and not in a limiting sense.

We claim:

1. A dust separator comprising a plurality of nested cones, said cones being spaced apart a relatively short distance, means rotating said cones on their axes at a relatively high rotational speed, means creating a current of dust-laden gas, scalping means directing said gas current to the outer periphery of said cones and imparting to said gas current a tangential velocity of the order of magnitude of the tangential velocity of the cones, comprising a plurality of radial fan blades arranged coaxially with and fixed to at least one of said cones and rotating therewith, means for introducing the dust-laden gas to the center of said fan blades, said current-creating means forcing the gas from the center of the cones and discharging it from the separator, and means for collecting precipitated dust comprising a chamber surrounding said cones and receiving dust from the periphery thereof and from said scalping means.

2. A dust separator comprising a plurality of nested cones, said cones being spaced apart a relatively short distance, means rotating said cones on their axes at a relatively high rotational speed, means creating a current of dust-laden gas, means directing said gas current to the outer periphery of said cones and imparting to said gas current a tangential velocity of the order of magnitude of the tangential velocity of the cones, comprising a plurality of fan blades arranged coaxially with and fixed to at least one of said cones and rotating therewith, means for introducing the dust-laden gas to the center of said fan blades, said current-creating means forcing the gas from the center of the cones and discharging it from the separator, and means for collecting precipitated dust comprising a chamber surrounding said cones and receiving dust from the periphery thereof, said last-named means being rotatable along with said cones.

3. A dust separator comprising a plurality of nested cones, said cones being spaced apart a relatively short distance, means rotating said cones on their axes at a relatively high rotational speed, means creating a current of dust-laden gas, means directing said gas current to the outer periphery of said cones and imparting to said gas current a tangential velocity of the order of magnitude of the tangential velocity of the outer periphery of the cones, comprising a plurality of radial fan blades arranged coaxially with and fixed to at least one of said cones and rotating therewith, means for introducing the dust-laden gas to the center of said fan blades said current-creating means forcing the gas from the center of the cones and discharging it from the separator and a single cone arranged coaxially with said first-named cones and spacing the first-named cones and the said fan blades apart said single cone having a closed center whereby gas passes from the said fan blades to the first-named cones only at the peripheries thereof.

4. A dust separator comprising a plurality of nested cones, said cones being spaced apart a relatively short distance, means rotating said cones on their axes at a relatively high rotational speed, means creating a current of dust-laden gas, means directing said gas current to the outer periphery of said cones and imparting to said gas current a tangential velocity of the order of magnitude of the tangential velocity of the cones, whereby said dust-laden gas has a portion of its dust content precipitated therefrom, said last-named means comprising a plurality of fan blades arranged coaxially with and fixed to at least one of said cones and rotating therewith, and means for introducing the dust-laden gas to the center of said fan blades, said current-creating means including means withdrawing the gas from the center of the cones and discharging it from the separator.

5. A dust separator comprising means for rotating dust-laden gas and directing the gas outwardly and thereby partially purifying the gas by separating therefrom the larger particles, a surface surrounding said means against which said particles are deposited, a plurality of nested cones, said cones being spaced apart a relatively short distance, and being likewise surrounded by said surface, means rotating said cones on their axes at a relatively high rotational speed, said gas current flowing inwardly between said cones at a high tangential velocity, whereby said gas current flows through said cones to the center thereof in the manner of a vortex, the vortex movement of the gas causing precipitation of the dust particles therefrom on to the surfaces of the cones, and the centrifugal action occasioned by the rotation of said cones causing the precipitated dust particles to move radially outwardly on the cones in counter-current to the gas current and be thrown against said first-named surface.

6. In a dust separator, a driven shaft supported on a vertical axis, a shrouded impeller mounted on said shaft, said impeller having a downwardly protruding inlet mouth, a separator comprising a series of spaced truncated cones, nested under the inlet mouth of said impeller, for rotation therewith, said cones flaring upwardly and outwardly, the truncated ends thereof being open to form an axial space communicating with said mouth, the bottom cone being closed, and a dust collector casing surrounding said separator and mounted upon the impeller, for rotation therewith.

7. In a dust separator, a driven shaft supported on a vertical axis, a shrouded impeller mounted on said shaft, said impeller having a downwardly protruding inlet mouth, a separator comprising a series of spaced truncated cones, nested under the inlet mouth of said impeller, for rotation therewith, said cones flaring upwardly and outwardly, the truncated ends thereof being open to form an axial space communicating with said mouth, the bottom cone being closed, and a dust collector casing surrounding said separator and mounted upon the impeller, for rotation therewith, radial fan blades mounted on the under side of said bottom cone, a cone-shaped casing member nested over said bottom cone and disposed in such manner that said radial fan blades extend entirely across the annular space between said bottom cone and the cone-shaped casing member, said cone-shaped casing member being provided with an opening at its apex for admitting dirt-laden gas, and a dust collector casing surrounding said separator and mounted upon the impeller, for rotation therewith.

HUGO VAN ROSEN.
GROVER W. LAPP.